United States Patent [19]

Forkel

[11] Patent Number: 4,626,781
[45] Date of Patent: Dec. 2, 1986

[54] DEVICE FOR DETECTING THE SPEED OF ROTATION AND/OR AN ANGLE OF ROTATION OF A SHAFT

[75] Inventor: Werner Forkel, Stuttgart, Fed. Rep. of Germany

[73] Assignee: Daimler-Benz Aktiengesellschaft, Stuttgart, Fed. Rep. of Germany

[21] Appl. No.: 716,931

[22] Filed: Mar. 28, 1985

[30] Foreign Application Priority Data

Mar. 30, 1984 [DE] Fed. Rep. of Germany ....... 3411773

[51] Int. Cl.$^4$ .............................................. G01P 3/48
[52] U.S. Cl. ..................... 324/174; 310/155; 310/168
[58] Field of Search ............... 324/173, 174, 166, 167, 324/207, 208, 260, 262; 310/155, 168; 73/518, 519, 520; 340/669, 670, 671, 672, 686; 336/30, 45, 110; 246/249

[56] References Cited

U.S. PATENT DOCUMENTS 3,041,483  6/1962  Ebbinghaus et al. ............... 310/155
4,236,093  11/1980  Birnbaum ........................ 324/207 X
4,268,771  5/1981  Lace ................................. 310/168 X Primary Examiner—Reinhard J. Eisenzopf
Assistant Examiner—Jack B. Harvey
Attorney, Agent, or Firm—Barnes & Thornburg

[57] ABSTRACT

A device for detecting the speed of rotation and/or an angle of rotation of a shaft having a motion transmitter which rotates with the shaft, the device consisting of a magnetic-field-dependent sensor which receives a signal from the motion transmitter. A permanent magnet is arranged in the vicinity of the sensor with an evaluating circuit, the sensor being an integrating component of the evaluating circuit. The arrangement of the permanent magnet with respect to the sensor and of the permanent magnet and sensor with respect to the motion transmitter, on the one hand, and the construction of the sensor as a saturable-core probe (fluxgate effect), on the other hand, make it possible to detect even very slow rotational movements such as occur, for example, with antiblocking systems or forward drive control systems in motor vehicles.

15 Claims, 9 Drawing Figures

DEVICE FOR DETECTING THE SPEED OF ROTATION AND/OR AN ANGLE OF ROTATION OF A SHAFT

BACKGROUND OF THE INVENTION

The invention relates to a device for detecting the speed of rotation and/or an angle of rotation of a shaft having a motion transmitter which rotates with the shaft and which has on its periphery areas of high magnetic permeability and areas of low magnetic permeability, especially a ferromagnetic motion transmitter constructed as a toothed wheel or as a perforated or slotted disc, consisting of a magnetic-field-dependent sensor, which senses the motion transmitter and is arranged at a distance from the latter, of a thin, soft-magnetic strip core, which preferably has high permeability and low hysteresis and eddy-current losses, comprising a coil which is wound onto this core transversely to the longitudinal direction and has coil connections, a permanent magnet which is likewise arranged at a distance from the motion transmitter and sensor, the sensor and permanent magnet being arranged spatially behind each other, related to the motion transmitter, and in such a manner that the lines of force of the permanent magnet pass perpendicularly through the flat side of the strip core, and of an evaluating circuit into which the coil is integrated via the coil connections.

The magnetic sensing of rotational speeds, reference markets or similar of rotating parts with the assistance of transmitters, for example by means of inductive transmitters (German Offenlegungsschrift No. 2,939,643, (German Offenlegungsschrift No. 2,924,590), Hall transmitters (German Offenlegungsschrift No. 3,231,391, German Offenlegungsschrift No. 2,814,606), magneto-resistive sensors (German Offenlegungsschrift No. 3,122,376) or Wiegand elements is known. For this purpose, all devices require as the motion transmitter ferro-magnetic transmitter wheel, mostly constructed-in the form of a toothed wheel or of a perforated or slotted disc. In this arrangement, the necessary premagnetization in the sensor is produced by at least one permanent magnet. As an alternative, the magnets can also be mounted on the motion transmitter. However, it is always the modulation of the magnetic flux by the sensor as a consequence of the rotational movement which is utilized for detecting the signal.

In the automotive field, the inductive transmitter has heretofore been most successful since it is rugged and of simple construction and has a large range of operating temperatures. However, the detection of very low rotation speeds such as occur, for example, with anti-blocking systems or with the forward drive control system, its use is associated with problems since its output signal is a function of the rotational speed.

This situation is not remedied by the generic device according to German Offenlegungsschrift No. 3,205,625 which uses an inductive transmitter comprising two sensor coils and in which the quotient of the two coil inductances is evaluated since this only eliminates possible air-gap fluctuations between the sensor and the motion transmitter.

SUMMARY OF THE INVENTION

The invention has the object of developing a device of this type, while retaining the proven advantages of an inductive transmitter, in such a manner that it becomes possible to sense even very slow rotational movements, especially without having to reduce the distance between the device and the motion transmitter.

An object according to the invention is to provide an inductive transmitter employing a permanent magnet proximate a motion transmitter and facing the latter, the magnet being arranged with poles aligned in a peripheral direction of the motion transmitter in front of a sensor and lying in one plane with the latter, a strip core of which sensor is again aligned in the longitudinal direction perpendicular to a magnetic axis of the permanent magnet and to the motion transmitter. A coil of the sensor is fed by an evaluating circuit with an impressed alternating current of high frequency and the strip core is driven into saturation. The device according to the invention thus combines the advantages of ruggedness and wide temperature range of the inductive transmitter with the advantage of a lower frequency limit of zero. The high sensitivity, making it possible to maintain a relatively large distance between the device and motion transmitter, is also advantageous.

Another object of the invention is to provide a device for detecting speed of rotation or an angle of rotation of a shaft, the device having a ferro-magnetic motion transmitter which rotates with the shaft and which has under periphery thereof areas of high magnetic permeabilities and areas of low magnetic permeabilities and configured as a toothed wheel or a slotted or perforated disc, a magnetic-field-dependent sensor means for sensing motion of the motion transmitter and arranged at a distance from the motion transmitter and comprising a soft-magnetic planar strip core of high permeability and low hysteresis and eddy current losses, an evaluating circuit having a coil wound onto the core transversely to a longitudinal direction of the core, a permanent magnet arranged at a distance from the motion transmitter and sensor, the sensor, permanent magnet and motion transmitter being substantially linearly disposed with respect to each other with the sensor remote with respect to the motion transmitter with lines of magnetic force of the permanent magnet passing substantially perpendicularly through a flat side of the strip core and through said evaluating circuit and wherein the permanent magnet has holes disposed substantially equidistant from the periphery of the motion transmitter and disposed between the motion transmitter and the sensor and lying substantially in the plane of the strip core, the strip core of the sensor being aligned in a longitudinal direction substantially perpendicular to a magnetic axis of the permanent magnet and to the motion transmitter, and means for driving the strip core into saturation in response to a high frequency current from the evaluating circuit.

Another object of the invention is to provide a device for detecting speed or angle of rotation of a shaft wherein the linear disposition of a motion transmitter, permanent magnet and sensor is substantially radial with respect to an axis of rotation of the motion transmitter and poles of the permanent magnet are aligned substantially tangentially with respect to the periphery of the motion transmitter.

Another object of the invention is to provide a means for detecting speed or angle of rotation of the shaft wherein the linear disposition of the motion transmitter, permanent magnet and sensor is substantially parallel to an axis of rotation of the motion transmitter substantially at the periphery of the motion transmitter.

It is another object of the invention to provide a means for detecting speed of rotation or angle of rotation of a shaft wherein a dimension of a permanent magnet substantially parallel to the periphery of a motion transmitter corresponds substantially in magnitude to a dimension of the area of high magnetic permeability of the motion transmitter in a direction substantially tangential to the periphery thereof.

It is another object of the invention to provide a device for detecting speed or angle of rotation of a shaft employing a strip core with a coil former comprising two spaced ceramic platelets bonded on opposite sides of the strip core.

It is another object of the invention to provide a coil for a sensor of a device for detecting speed of angle of rotation of a shaft comprised of thin film or thick film materials.

It is another object of the invention to provide a device for detecting speed or angle of rotation of a shaft employing flux-conducting plates of a soft magnetic alloy disposed at a distance from and over substantially the longitudinal extent of a permanent magnet and a sensor.

It is another object of the invention to provide a device for detecting speed or angle of rotation of a shaft wherein a housing is provided for a permanent magnet, sensor and flux-conducting plates.

It is another object of the invention to provide a device for detecting speed or angle of rotation of a shaft comprising a series circuit of a capacitor, sensor and a resistor, the latter connected to ground, the series circuit being provided with a signal from a square wave generator means of high frequency voltage to drive the sensor to saturation.

It is another object of the invention to provide a device for detecting speed or angle of rotation of a shaft employing an evaluator circuit comprised of an oscillator circuit and a sensor which comprises a magnetically controlled inductance as part of the oscillator circuit.

It is another object of the invention to provide a device for detecting speed or angle of rotation of a shaft wherein a sensor comprises two part-magnets mounted on sides of a strip core.

It is another object of the invention to provide a device for detecting speed or angle of rotation of a shaft wherein a sensor comprises a permanent magnet of samarium/cobalt alloy.

It is another object of the invention to provide a device for detecting speed or angle of rotation of a shaft wherein a coil of a sensor comprises a heat-resistant insulated copper wire.

It is another object of the invention to provide a device for detecting speed or angle of rotation of a shaft wherein a permanent magnet, sensor and flux-conducting plates are enclosed in a housing comprised of a magnetically shielding material.

Thus, the device can be arranged, without impairment of its advantages, in dependence on the installation conditions both in the radial and in the axial direction with respect to the motion transmitter, referred to the motion transmitter, the extremely small construction being of further advantage despite the fact that permanent magnet and sensor are arranged behind each other in their longitudinal extent.

The foregoing features, and advantages of the present invention will become more apparent from the following description when taken in connection with the accompanying drawings which show, for the purposes of illustration only, one embodiment in accordance with the present invention.

DESCRIPTION OF THE PREFERRED EMBODIMENTS

Figure 1A:
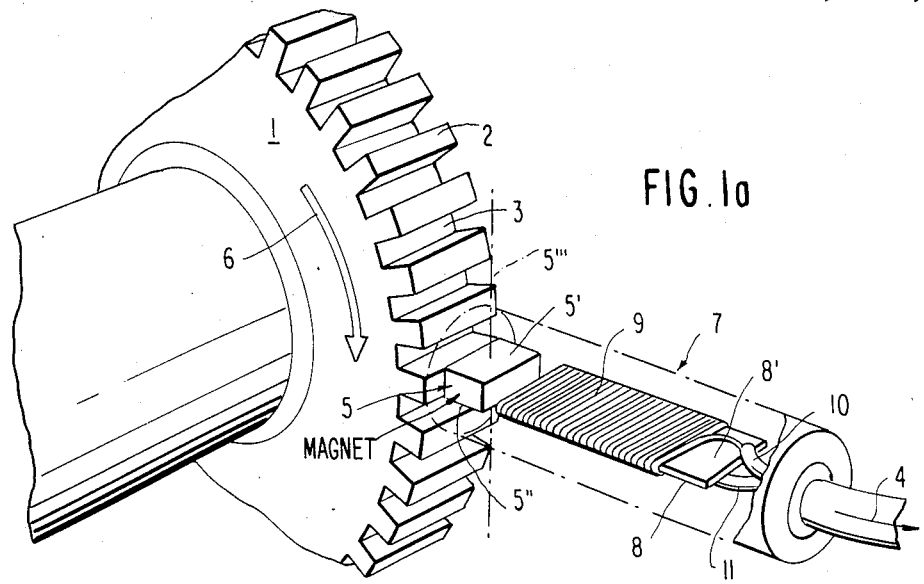
FIG. 1a shows a diagrammatic representation of the arrangement of the device in radial extent, referred to the motion transmitter.
Figure 1D:
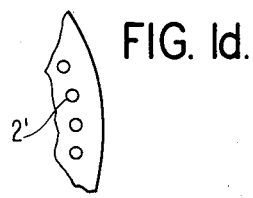
FIG. 1d shows a modification of the embodiment of FIG. 1c.
Figure 1B:
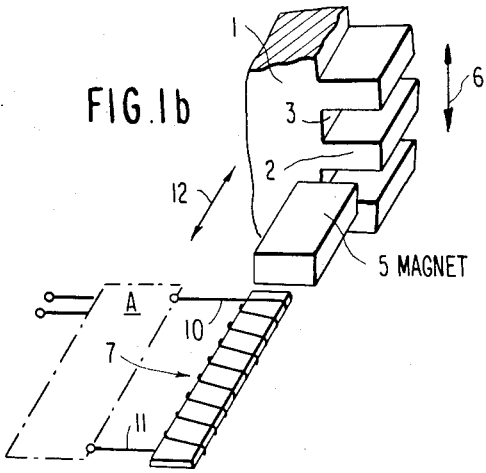
FIG. 1b shows in diagrammatic representation the arrangement of the device in axial extent, referred to the motion transmitter.
Figure 1C:
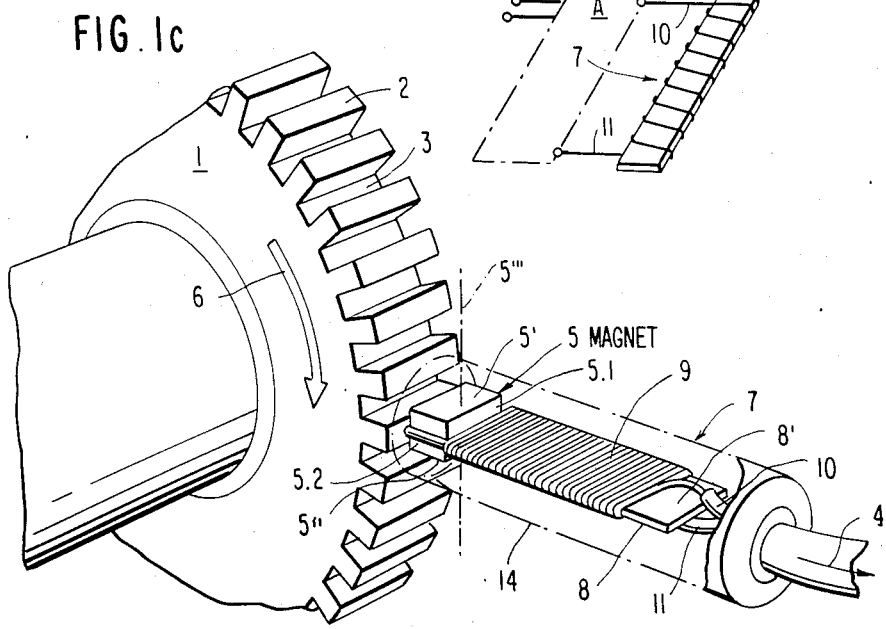
FIG. 1c shows in diagrammatic representation the arrangement of the device in radial extent, in which arrangement, however, the permanent magnet consists of two part-magnets mounted on the strip core.

Referring now to the drawings wherein like reference numerals are used to designate like parts and more particularly to FIGS. 1a and 1c, a motion transmitter 1 is shown in the form of a toothed wheel which is joined to the shaft, the rotational speed of which is to be determined. The areas of high magnetic permeability of the motion transmitter 1 are in this arrangement formed by the teeth 2 and the areas of low magnetic permeability by the toothed spaces 3. In lieu of the wheel with teeth 2 a disc with perforations 2' may be employed as shown in FIG. 1d. In the radial direction 4 of the motion transmitter 1, a cube-shaped permanent magnet 5, preferably consisting of a samarium/cobalt alloy because of the small dimensions possible, is arranged at a distance from the tooth 2 in such a manner that the poles 5' and 5" of this magnet and thus also its magnetic axis 5''' are aligned in the peripheral direction or in the tangential direction 6 of the motion transmitter 1. In this arrangement, the dimensions of the permanent magnet 5 are selected in such a manner that its width approximately corresponds to the width of the tooth 2, FIG. 1a, or to the height of the tooth 2, FIG. 1b, and its thickness approximately corresponds to the thickness of the tooth 2. In the radial direction 4, the sensor 7 is also arranged at a small distance to the permanent magnet 5 and lying in one plane with the permanent magnet 5. The sensor 7 consists of a thin, soft-magnetic strip core 8, preferably having a high permeability and low hysteresis and eddy-current losses, the amorphous alloy Vitravac 6023 X in the firm of thin (25 micrometer) strips has been found to be particularly advantageous, and of a coil 9, which is wound onto this core transversely to the longitudinal direction, having coil connections 10 and 11. The sensor 7 is manufactured, for example, in such a manner that a piece of strip 8 of the above-mentioned alloy and having the dimensions of 20×2.5×0.025 mm is inserted between two thin ceramic platelets having the dimensions of 20×3×0.5 mm and is bonded to the latter as a coil former; onto the coil former produced in this manner, approximately 250–500 turns of heat-resistant insulated copper wire with a diameter of, for example, 0.1 mm are wound; as an alternative, the coil and/or the amorphous alloy can also be applied to the strip as a metal film, for example by using thin film or thick film techniques.

According to FIG. 1c, the two part-magnets 5.1 and 5.2 of the permanent magnet 5 can also be arranged on the strip core 8 if the permanent magnet is constructed of two parts, particularly for production reasons. In relation to the permanent magnet 5, the sensor 7 is now arranged in such a manner that the strip core 8 extends longitudinally in the radial direction 4, that is to say, perpendicularly to the magnetic axis 5''' and to the motion transmitter 1 or the tooth 2, and the flat sides 8' lie in the tangential direction 6.

The illustrative embodiment of FIG. 1b differs from this only in that the magnet 5 and the sensor 7 are arranged, instead of in the radial direction 4, in the axial direction 12 of the motion transmitter 1 and in its peripheral vicinity.

Figure 2A:
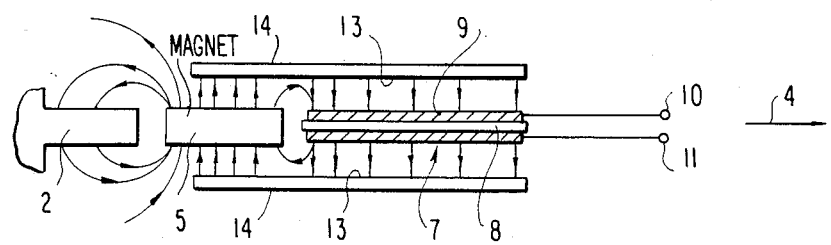
FIG. 2a shows the operation of the principle with undisturbed lines of force.

If now, as shown in FIG. 2a, one tooth 2 of the motion transmitter 1, the permanent magnet 5 and the sensor 7 lie in one plane in the radial direction 4, the lines of force of the permanent magnet 5, on the one hand, pass through the flat side 8' of the strip core 8 and, on the other hand, perpendicularly through the tooth 2. With this ideal symmetry of arrangement and thus undisturbed lines of force, no field component exists in the radial direction 4 or in the longitudinal direction of the sensor. If necessary, a better concentration of the lines of force on the sensor can be achieved by additional flux-conducting plates 13 of a soft-magnetic alloy, for example Permenorm, in which arrangement additional eddy-current damping at higher speeds of rotation must be prevented from occurring by appropriately shaping these plates. The entire arrangement itself, in turn, is installed in a suitable protective housing 14, preferably of a magnetic magnetically shielding material which is provided with the known means for mounting inductive transmitters and which provides for relief of stress on the coil connections 10, 11.

Figure 2B:
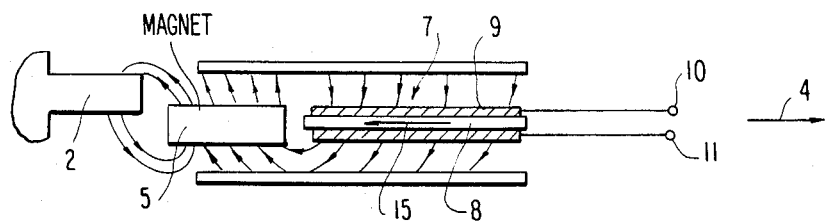
FIG. 2b shows the operation of the principle with lines of force disturbed by upward deflection.
Figure 2C:
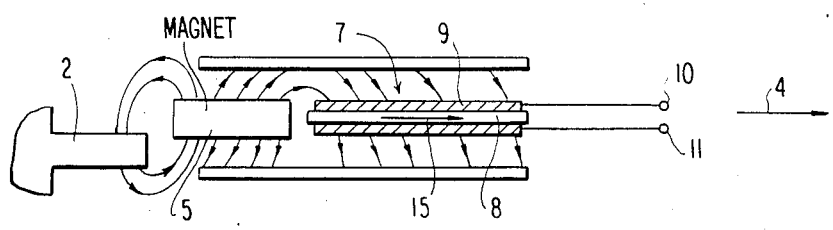
FIG. 2c shows the operation of the principle with lines of force disturbed by downward deflection.

If now the symmetry of the field distribution is disturbed via the ferro-magnetic return of the lines of force via a tooth 2 moving past, the lines of force of the permanent magnet 5, see FIG. 2b and FIG. 2c, no longer pass perpendicularly through the sensor 7 and in the longitudinal direction of the sensor (corresponding to the radial direction 4) a field component shown by the arrow 15 occurs which causes the strip core 8 to be premagnetized in its longitudinal direction. During this process, depending on the deflection of the field distribution, the field component 15 is directed either towards the permanent magnet 5, FIG. 2b shows the upward deflection of the field distribution by the tooth 2, or directed away from the permanent magnet 5, FIG. 2c shows the downward deflection of the field distribution by the tooth 2, so that the direction of premagnetization of the field component 15 also makes it possible to differentiate between whether a field distortion by the tooth 2 from the top or from the bottom is predominant.

Figure 3:
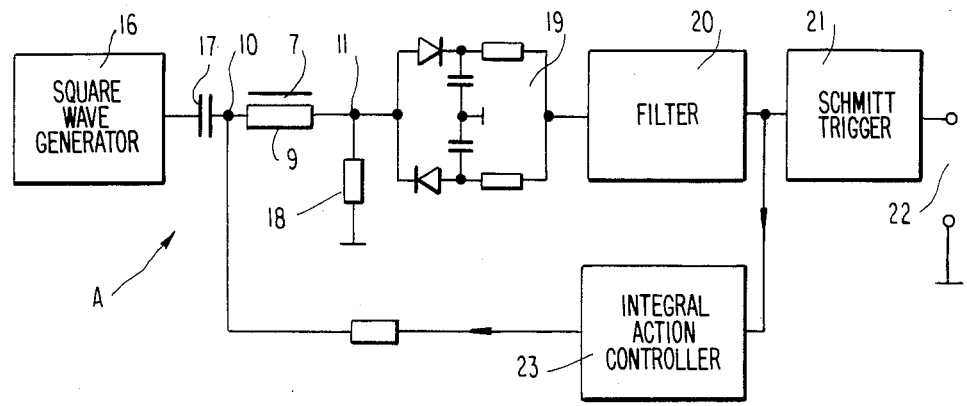
FIG. 3 shows a first illustrative embodiment of the evaluating circuit of the device into which the sensor coil is integrated.
Figure 4:
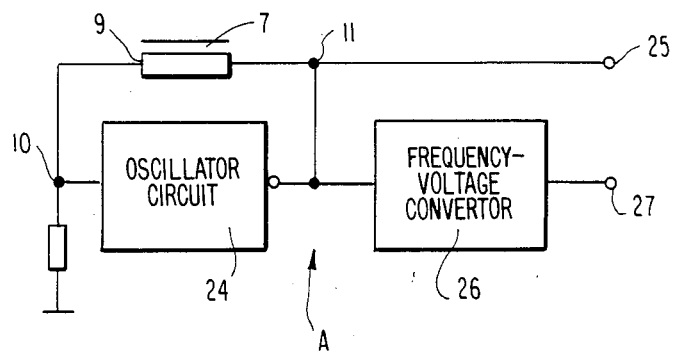
FIG. 4 shows a second illustrative embodiment of the evaluating circuit into which the sensor coil is integrated.

As can be seen from FIG. 3 and FIG. 4, the sensor 7 is an integral component of an evaluating circuit A, in such a manner that the coil 9 is integrated in the circuit via the coil connections 10 and 11. The coil 9 is fed by the evaluating circuit A with an impressed alternating current of high frequency (for example 100 kHz) which drives the strip core 8 into saturation. If the field distribution is disturbed and the field component 15, therefore, occurs in the longitudinal direction of the sensor 7, the strip core 8 reaches saturation earlier in the halfwave in which the alternating field of the premagnetizing field component 15 is rectified more than in the other halfwave. This produces asymmetry in the induced voltage which can be tapped off at the coil 9 and which is evaluated in the evaluating circuit as follows, see FIG. 2. A square wave generator 16 generates an alternating voltage, the curve shape of which is altered by a capacitor 17, the sensor coil 9 and a resistor 18 in such a manner that a pulse-shaped current flows through the coil 9. The positive and negative peak values of the current are detected at the resistor 18 by a dual peak-rectifier circuit 19 and are arithmetically added so that, if the symmetry of the sensor 7 is undisturbed, a voltage of zero is present at the input of a filter 20 but a voltage of greater than zero is present if the symmetry is disturbed. The filter 20 has the job of separating the high-frequency control voltage with as steep a slope as possible from the low-frequency rotational speed signal. Subsequently, the rotational speed signal present with disturbed symmetry is also processed in a Schmitt trigger 21 to form a square wave signal so that a signal proportional to the rotation speed is present at the output 22. By generating a compensating current, an additional integral-action controller 23 keeps the mean value of the signal voltage at the output of the filter 20 at zero even if the symmetry of the sensor is disturbed by a constant external field such as, for example, the earth magnetic field. In this arrangement, the time constant of the RC section of the integral-action controller 23 must be dimensioned in such a manner than the slowest rotational speed signal to be detected is not yet controlled.

However, the evaluating circuit A can also be configured as shown in FIG. 4 in which the coil 9 of the sensor 7 is incorporated as a magnetically controlled inductance into an oscillator circuit 24. In this arrangement, the oscillator operating as an inverting Schmitt trigger changes its frequency as a function of the change of inductance of the coil 9 so that the frequency change is further processed as output signal either directly via the digital output 25 or initially via a frequency/voltage converter 26 and then via the analog output 27 in a followup evaluating circuit connected to these outputs.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A device for detecting one of a speed of rotation and an angle of rotation of a shaft, having
   a ferro-magnetic motion transmitter which rotates with the shaft and which has on a periphery thereof areas of high magnetic permeability and areas of low magnetic permeability and configured as one of a toothed wheel and a perforated disc,
   a magnetic-field-dependent sensor means for sensing motion of the motion transmitter and arranged at a distance from the motion transmitter and comprising a soft-magnetic planar strip core of high permeability and low hysteresis and eddy-current losses, an evaluating circuit having a coil wound onto the said strip core transversely to a longitudinal direction of the strip core, a permanent magnet arranged at a distance from the motion transmitter and sensor, the sensor, permanent magnet and motion transmitter being substantially linearly disposed with respect to each other with the sensor remote with respect to the motion transmitter with lines of magnetic force of the permanent magnet passing substantially perpendicularly through a flat side of the strip core and through said evaluating circuit and wherein said permanent magnet having poles disposed substantially equidistant from the periphery of the motion transmitter and disposed between the motion transmitter and the sensor and lying substantially in the plane of the strip core, the strip core of the sensor being aligned in a longitudinal direction substantially perpendicular to a magnetic axis of the permanent magnet and to the motion transmitter, and means for driving the strip core into saturation in response to a high frequency current.

2. A device in accordance with claim 1, wherein the linear disposition of the motion transmitter, permanent magnet and sensor is substantially radial with respect to an axis of rotation of the motion transmitter, and the poles of the permanent magnet are aligned substantially tangentially with respect to the periphery of the motion transmitter.

3. A device in accordance with claim 1, wherein the linear disposition of the motion transmitter, permanent magnet and sensor is substantially parallel to an axis of rotation of the motion transmitter substantially at the periphery of the motion transmitter.

4. A device according to claim 1, wherein a dimension of the permanent magnet substantially parallel to the periphery of the motion transmitter corresponds substantially in magnitude to a dimension of the area of high magnetic permeability of the motion transmitter in a direction substantially tangential to the periphery thereof.

5. A device in accordance with claim 1, wherein the permanent magnet comprises of a samarium/cobalt alloy.

6. A device in accordance with claim 1, further comprising
a coil former comprising two spaced ceramic platelets bonded on opposite sides of said strip core.

7. A device in accordance with claim 1, wherein the coil of the sensor comprises heat-resistant insulated copper wire.

8. A device in accordance with claim 1, wherein the coil of the sensor is comprised of one of thin film and thick film materials.

9. A device in accordance with claim 1, further comprising
flux-conducting plates of a soft-magnetic alloy disposed at a distance from and over substantially the longitudinal extent of the permanent magnet and sensor, and substantially parallel to pole faces of the permanent magnet and to sides of the strip core.

10. A device in accordance with claim 9, further comprising
a housing extending substantially over the length of the permanent magnet, sensor and flux-conducting plates.

11. A device in accordance with claim 1, further comprising
a housing extending substantially over the length of the permanent magnet and the sensor and comprising flux-conducting plates.

12. A device in accordance with claim 10, wherein the housing is comprised of a magnetically shielding material.

13. A device in accordance with claim 1, further comprising
a series circuit comprising a capacitor, said sensor and a resistor, the resistor being also connected to ground, and wherein the means for driving the sensor to saturation comprises a square wave generator means for generating a high frequency voltage.

14. A device in accordance with claim 1, wherein the evaluator circuit comprises
an oscillator circuit, and the sensor comprises a magnetically controlled inductance of said oscillator circuit.

15. A device in accordance with claim 1, wherein the permanent magnet comprises
two part-magnets mounted on sides of the strip core.

* * * * *